United States Patent
Brülle-Drews

(10) Patent No.: US 7,386,437 B2
(45) Date of Patent: Jun. 10, 2008

(54) SYSTEM FOR PROVIDING TRANSLATED INFORMATION TO A DRIVER OF A VEHICLE

(75) Inventor: Christian Brülle-Drews, Hamburg (DE)

(73) Assignee: Harman Becker Automotive Systems GmbH, Northridge, CA (US)

( * ) Notice: Subject to any disclaimer, the term of this patent is extended or adjusted under 35 U.S.C. 154(b) by 639 days.

(21) Appl. No.: 10/917,944

(22) Filed: Aug. 13, 2004

(65) Prior Publication Data
US 2005/0086051 A1    Apr. 21, 2005

(30) Foreign Application Priority Data
Aug. 14, 2003    (EP)    ................... 03017683

(51) Int. Cl.
*G06F 17/28*    (2006.01)
(52) U.S. Cl. .................. 704/3; 704/7; 704/8; 704/270; 704/275; 704/276
(58) Field of Classification Search ............ 704/3, 704/7, 8, 270, 275, 276
See application file for complete search history.

(56) References Cited

U.S. PATENT DOCUMENTS

| | | | |
|---|---|---|---|
| 5,835,854 A | 11/1998 | Palisson et al. | |
| 6,148,105 A | 11/2000 | Wakisaka et al. | |
| 6,526,335 B1 * | 2/2003 | Treyz et al. | .................... 701/1 |
| 6,553,436 B2 * | 4/2003 | Ando et al. | .................... 710/25 |
| 6,615,130 B2 * | 9/2003 | Myr | ........................... 701/117 |
| 6,640,145 B2 * | 10/2003 | Hoffberg et al. | ............. 700/83 |
| 7,006,881 B1 * | 2/2006 | Hoffberg et al. | ............. 700/83 |
| 2003/0202683 A1 * | 10/2003 | Ma et al. | .................... 382/104 |

FOREIGN PATENT DOCUMENTS

DE    199 38 256 A1    2/2001

* cited by examiner

*Primary Examiner*—Vijay B Chawan
(74) *Attorney, Agent, or Firm*—Brinks Hofer Gilson & Lione

(57) ABSTRACT

A vehicle mounted translation system for providing language translation to a driver of a vehicle. The translation system may be associated with a vehicle navigation system. The translation system includes a translation device and a storage unit for storing language and translation information. The system further includes the ability to enter information to be translated into the system, data processing for retrieving a translation from storage based on the input of the first information, and the ability to provide the retrieved translation to the driver. Output of the translated information may be accomplished by, speech-to-speech and/or text-to-speech conversion of words and/or a text or image output to a visual display.

34 Claims, 11 Drawing Sheets

SYSTEM FOR PROVIDING TRANSLATED INFORMATION TO A DRIVER OF A VEHICLE

PRIORITY CLAIM

This application claims the benefit of European Patent Application No. EP 03 017 683.8, filed Aug. 14, 2003, which is hereby incorporated by reference herein in its entirety.

BACKGROUND OF THE INVENTION

1. Technical Field

This application relates to a system for outputting information to a driver of a vehicle. More particularly, this application relates to a vehicle mounted system for providing language translation output to a driver of a vehicle.

2. Related Art

Many cars have been equipped with a computer-based system for outputting information to the driver, such as telematic systems, navigation systems or, simply, car radio receivers. The purpose of these systems is to provide information concerning the traffic situation, such as traffic congestions, road closure for traffic and the like, or travel information, such as vistas of the area, hotel information, traffic announcements and the like, in the area where the driver is currently travelling.

For example, navigation systems calculate a driving route to a destination in response to an input by the driver and output driving recommendations according to the calculated route. Car radios output traffic announcements received from broadcasting stations and may be equipped with further functions such as RDS-TMC (Radio Data System—Traffic Message Channel) or TIM (Traffic Information Memory) for storing and utilizing traffic announcements for navigation purposes. Telematics refers to using computers with telecommunications systems, including dial-up service to the Internet, networks that rely on a telecommunications system to transport data systems used in automobiles that combine wireless communication with GPS tracking, and a wide range of telecommunication functions that originate or end inside automobiles. For example, telematic devices may provide a wireless connection to the Internet for receiving travel and traffic information and other useful services.

When travelling abroad drivers of vehicles may be confronted with an unfamiliar foreign language, thus making communication and travel more difficult. For example, in an emergency, it is extremely important for the driver to communicate instantaneously with emergency assistance resources for exchanging relevant information, e.g., where the accident happened, who was injured, and the like. In addition, language barriers also may make assistance from other road users or communication at a service station or with visitors from abroad, e.g., by taxi drivers, difficult. Thus, there is a need for an improved system for providing useful information to a driver of a vehicle, and in particular travel and/or traffic information. Hence, there is a need for a language translation system that facilitates communications for drivers of vehicles in wide variety of situations.

SUMMARY

This application relates to a system for providing relevant information to a driver of a vehicle. In particular, the system may be mounted in a vehicle and associated with the vehicle's navigation system for providing translated information to a driver of the vehicle. The system also may provide translated information to a driver of the vehicle. The system includes a translation device and a storage unit for storing for language and translation information. The system may include devices and methods for inputting information to be translated into a computer system associated with the vehicle, data processing for retrieving a translation of information from a storage unit, and output devices and methods for outputting the retrieved translation to the driver. Output of the translated information may be accomplished by, speech-to-speech and/or text-to-speech conversion of words and/or a text or image output to an audio and/or visual display.

Because many on-board computer devices, such as navigation systems, include devices for speech recognition and text-to-speech conversion, the navigation system may be used to provide the system described here in a safe, economical, and easy manner.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This application relates to a translation system, that may be associated with an on-board computer system of a vehicle, such as a navigation system, a telematic system, or any other on-board computer system (head unit), and that is equipped with a translation device. The translation system also provides a method for providing translated information to a driver of the vehicle.

Many current vehicles are equipped with an on-board computer system that may be used for navigation or telematic applications. The computer may have data processing capabilities comparable to that of a personal computer, which may be used to provide a translation function. Because the computer system may be mounted in the vehicle, an on-board computer-based system may operate simultaneously with driving of the vehicle so that the driver's attention may be exclusively focused on the driving of the vehicle and the surrounding circumstances, such as traffic conditions.

Figure 1:
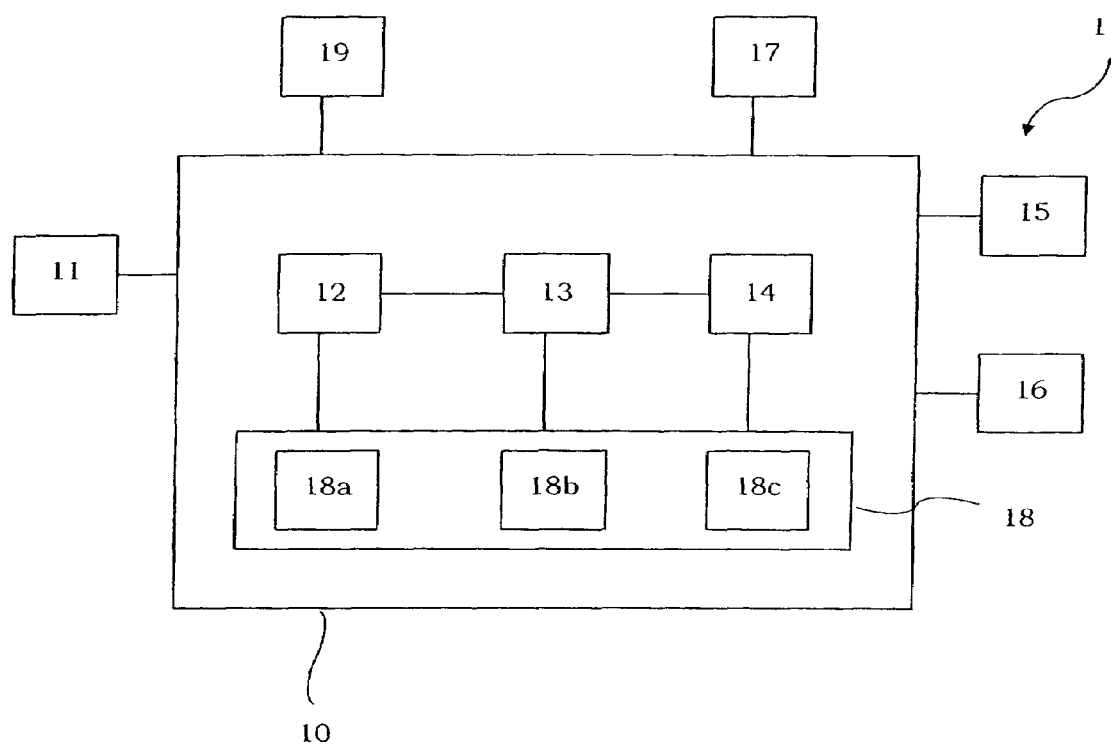
FIG. 1 is a block diagram of an example of a vehicle-mounted system having a speech recognition function and a text-to-speech conversion function.

The translation system may be a built-in system. The installation of the translation system may be of the conventional type such as a plug-in box. For example the translation system may be arranged inside the housing of a radio receiver. The translation system also may be mounted in a separate console. Mounting of the translation system in the vehicle may include being formed within the housing of a navigation system installed inside the vehicle. In this case the on-board computer of the vehicle may be utilized for both navigation and translation functions. For example, the translation system may include an additional software-implemented unit of the navigation system of the vehicle. Thus, both functions, navigation and translation, may be integrated into one on-board computer system of the vehicle. FIG. 1 shows an example of a vehicle-mounted translation system. The translation system 1 may include a computer-based system or head unit 10, a microphone 11, a set of loudspeakers 15 or other audio output device, a display unit 16, and a control panel 17. The head unit 10 may be connected to the microphone 11 for inputting words or sentences to be translated. The microphone 11 may be part of a headset or a hands-free set of a telephone.

The head unit 10 may include a speech recognition module 12 for the entry words to be translated, a translation module 13, which may be connected to the speech recognition module 12, and a text-to-speech module 14 for converting the translation result to speech and outputting via the loudspeaker 15, the display unit 16, or both. The loudspeaker 15 or the display unit 16 may be connected to the head unit 10. The speech recognition module 12, the translation module 13 and the text-to-speech synthesizer 14 may be connected to a storage device 18 of the computer-based system 10. The storage device 18 may include a speech recognition database 18a, a dictionary database 18b comprising data of a plurality of words and signs of at least two languages, a text-to-speech synthesizer database 18c and a RAM (not shown). The translation system 1 may be connected to an ignition lock 19 for starting the engine of the vehicle.

The language translation module of the system may comprise automatic language translation from one language to another for context-related coherent sentences or phrases. Since the meaning of words may be strongly dependent on context, the storage device may include additional language data serving as a data base for performing translation of coherent written or spoken text passages. The language data of the data storage device may go beyond the data of a dictionary and may include data relating to a context related meaning of words and phrases. The term "translation" should not be limited to the linguistic aspect of translating words from one language into another, but also includes the translation of any sign, character, or shape by providing information that reflects the meaning of the sign, character, or shape in terms of any other sign(s), character(s) or word(s). For example, the meaning of a traffic sign that generally may be known only to residents of the respective country may be "translated" for a driver who is not familiar with the meaning of that traffic sign. The "translation" provided may include an audio or textual translation, symbols, or a depiction of a sign having a similar meaning from the driver's home country. Thus, drivers travelling in foreign countries where they are not aware of the meaning of local traffic signs are aided in understanding local traffic signs, resulting in an increase in traffic safety, particularly in countries where characters are used which differ from those of the home country of the driver, such as Japanese or Arabian characters.

Figure 2:
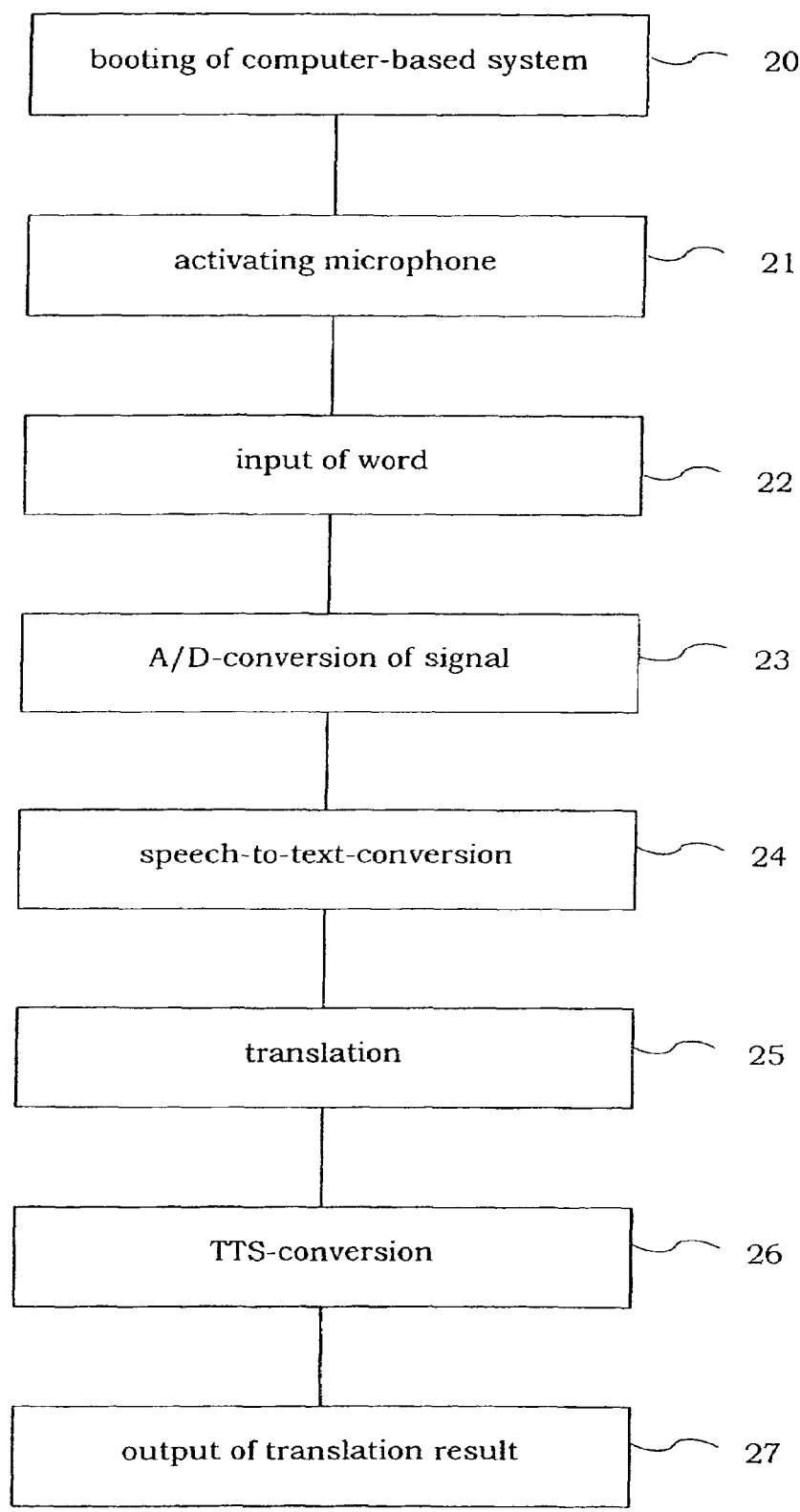
FIG. 2 is a flow chart illustrating an example of outputting translated information to a driver of a vehicle, including input supported by speech recognition and output by text-to-speech conversion.

The use of the system 1 of FIG. 1 is shown in FIG. 2. The translation system 1 may be booted 20 when the engine of the vehicle is started by the driver turning the ignition lock 19 with an ignition key. The driver may activate the microphone 21 for speech input by entering a command via the control panel 17. The driver may input a word, words, or phrase to be translated 22, e.g., "UNFALL," by speaking into the microphone 11. An analog-to-digital conversion of the analog audio signal into a digital signal may be performed 23 by the speech recognition module 12, in any manner known to those skilled in the art. The information also may be entered by way of a keyboard, joystick, shaft encoder, touch screen, touch pad, or the like, thus facilitating operation of the system while driving.

The speech recognition module 12 may compare the signal with data, including words and/or syllables loaded into the RAM, that is stored in the data base 18b of the system. The data base 18b may be edited by the driver to increase its recognition performance according to the known principles of speech recognition. By checking the output of the A/D-conversion against the stored patterns of the database 18b, the speech input of the driver may be converted to text 24. After the deciphered text is transmitted to the translation module 13, the English translation "ACCIDENT" of the German word "UNFALL" may be retrieved 25 by the translation module 13 from the dictionary data base 18b. The translation result transmitted from the translation module 13 may be converted into speech by the text-to-speech module 14 including natural language and digital signal processing according to the known principles of text-to-speech synthesis 26. The English translation "ACCIDENT" may be provided to the driver 26, for example, by way of loudspeakers 15 and/or on the display 16.

Figure 3:
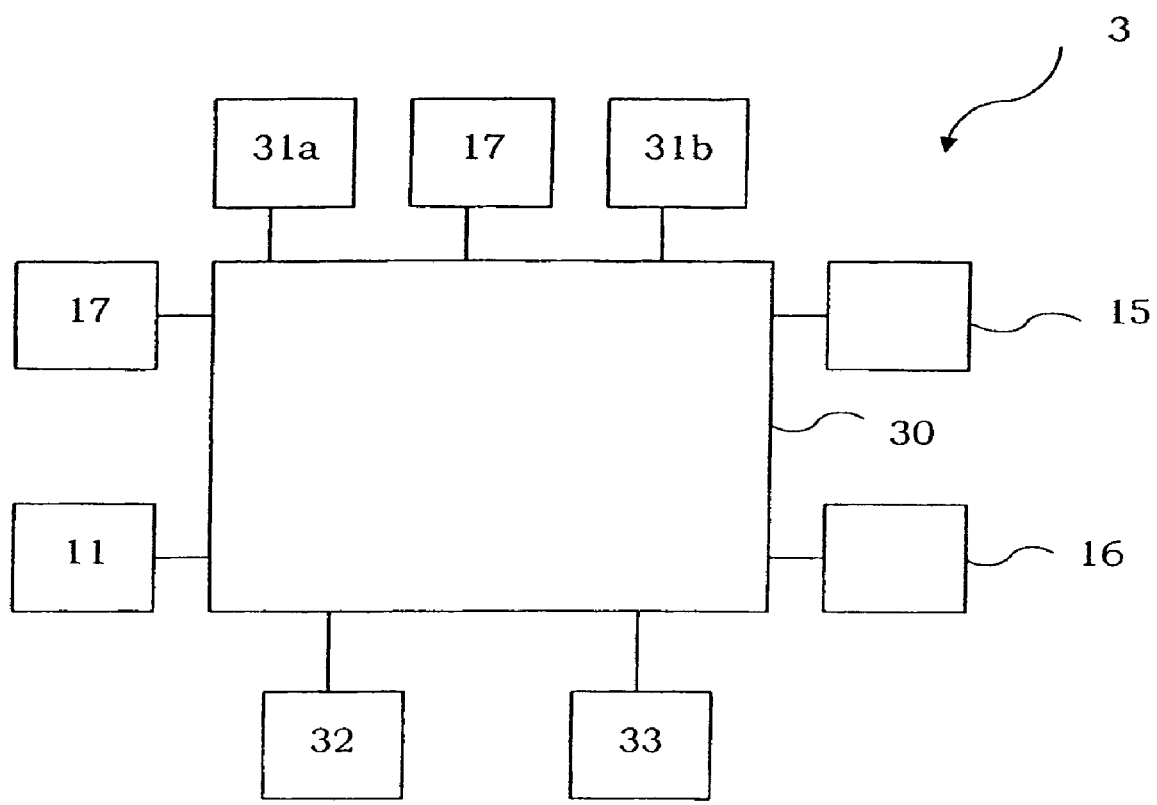
FIG. 3 is another example of a block diagram of a vehicle-mounted translation system.
Figure 4:
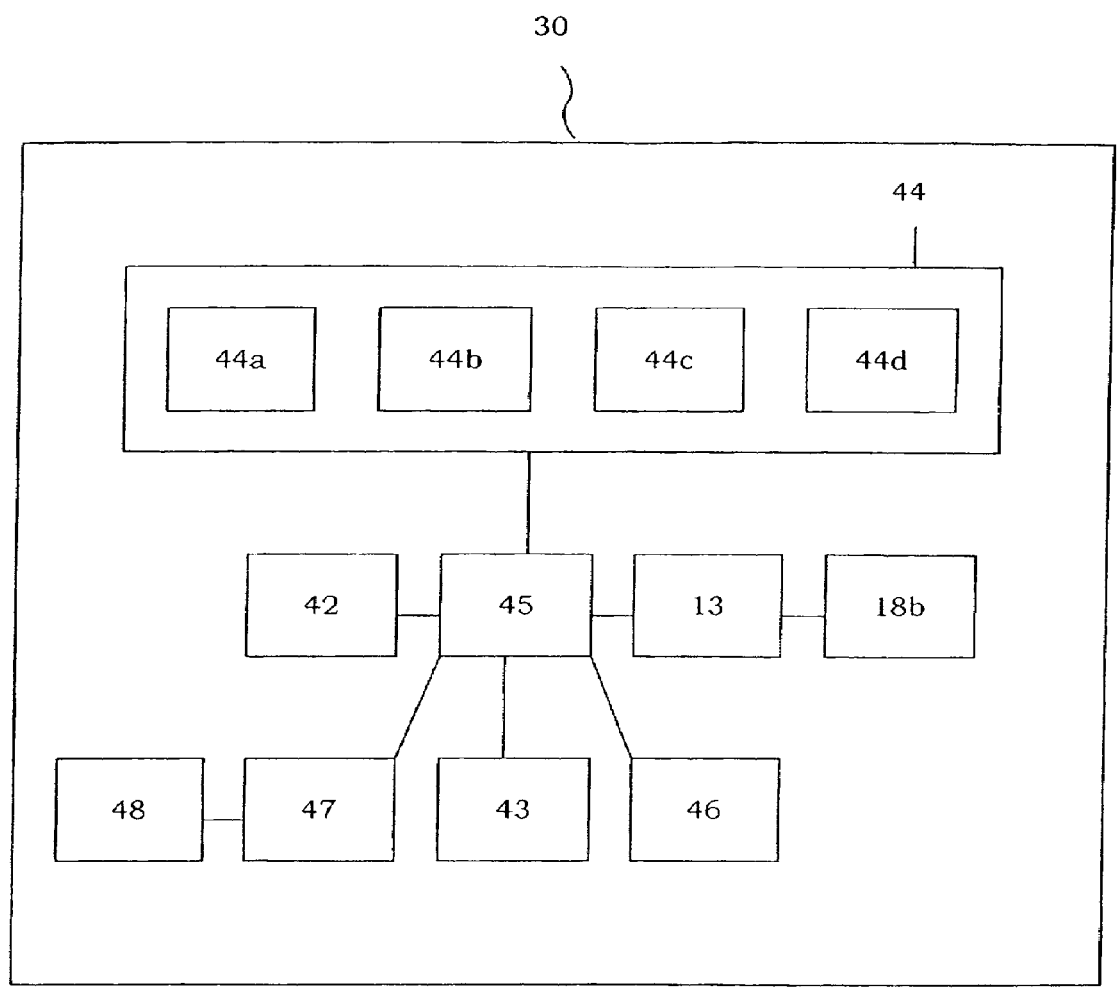
FIG. 4 is a block diagram of an example of a head unit of the system shown in FIG. 3.

FIGS. 3 and 4 illustrate an example of a configuration of a translation system 3, including digital video cameras for detecting traffic information during a trip, is illustrated in FIGS. 3 and 4. The translation system 3 shown in FIG. 3 may include a head unit 30 and, as additional components, a pair of digital video cameras 31a and 31b, a GPS-module 32 for determining the position of the vehicle and a gyrometer 33 for determining the advancing direction of the vehicle. The head unit 30 of the translation system 3 of FIG. 3 is illustrated in more detail in FIG. 4. Head unit 30 may include a pattern recognition module 44 for analyzing the images obtained by the digital video cameras 31a and 31b.

The pattern recognition module 44 may include a text recognition module 44a, an information sign recognition module 44b, a traffic sign identification module 44c and an information sign storage module 44d.

The information sign recognition module 44b may continuously analyze the image detected by the video cameras 31a, 31b for detecting an information sign based on its shape and dimensions. To determine whether the information sign detected by the information sign recognition module 44b is a traffic sign, the traffic sign identification means 44c may analyze the image of the detected information sign by comparing it to traffic signs of different countries stored in the information sign storage means 44d. The text recognition module 44a may perform an image analysis in order to recognize and extract text of the information sign.

The head unit 30 also may include a data processing unit 45 which may be connected to the pattern recognition unit 44, a translation module 13, a data storage device 46, a vehicle position determination module 43 for determining the position of the vehicle based on the signals received from, for example, a GPS module 32, an information sign position determination module 42 for determining the position of an information sign which has been detected within the images obtained by the digital video cameras 31a and 31b, as described below, and a navigation module 47. The navigation module 47 may calculate a driving route using map data of an area where the driver is travelling, which is stored in the map data storage device 48, for example, a CD-ROM. The navigation module 47 also may calculate the current position of the vehicle, as determined by the vehicle position determination module 43 in response to an entry of a final destination by the driver. The navigation module 47 then may provide driving recommendations to the driver based on the current position of the moving vehicle according to known principles of vehicle navigation. The data processing unit 45 may, for example, compare or transmit data between the components 13, 42-44 and 46-48, according to predetermined sequences defined by the respective software module and/or control by the user.

Figure 5:
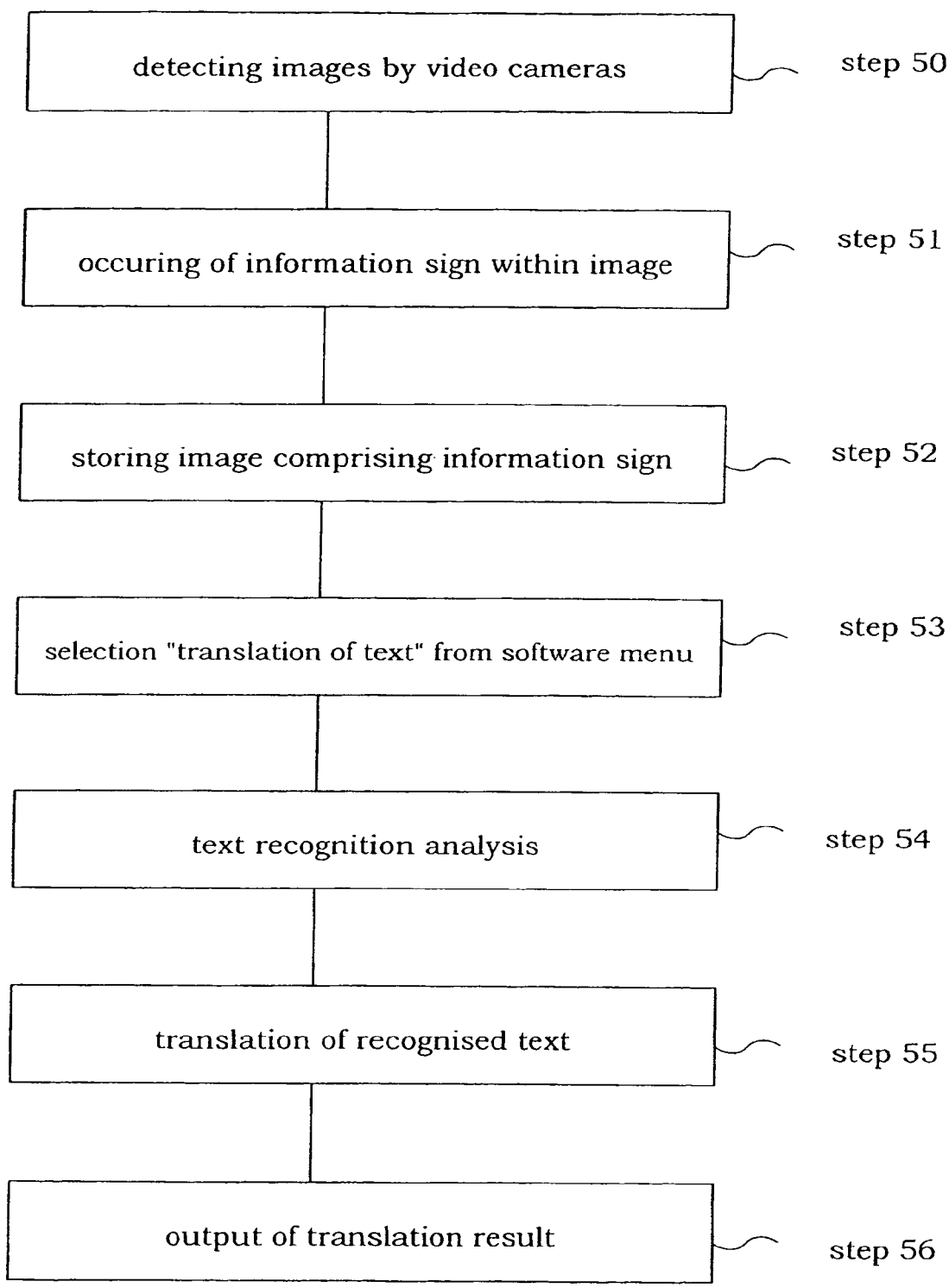
FIG. 5 is a flow chart illustrating the outputting of information to a driver of a vehicle, including the detection and translation of an information sign.

FIG. 5 shows an example of a method for providing translated information to a driver of a vehicle using the system shown in FIGS. 3 and 4. A vehicle comprising the translation system 3 of FIGS. 3 and 4 travelling along an Italian highway (A22 named "Autostrada del Brennero"), for example, is shown in FIG. 5. The video cameras 31a and 31b may be continuously monitoring the highway in the area of the vehicle 50 as the vehicle advances. For example, the images may include a portion of the field of view of the driver, including the field of view to the front and sides of the driver. The detected images may be continuously displayed on the display 15 of the translation system 3 during the drive.

In the example shown in FIG. 5, as the vehicle advances within the image currently monitored by the video cameras 31a, 31b, an information sign of a traffic guidance system installed over the highway occurs displaying the traffic information: "10 CHILOMETRI DI COLONNA DALLO SVINCOLO DI CARPI ALL'ALLACCIAMENTO DELL'A1" 51. When the driver notices the information sign he may select the item "storing image" 52 from the software menu, and the item "translation of text" 53. The translation command may be simply entered by finger tapping on the information sign of the image, for example, if the display 16 includes a touch screen.

A text recognition analysis may be performed 54 of the entire image stored, which may include not only the information sign, but also the highway, other cars driving in front of the vehicle, the horizon, and the like, by the text recognition module 44a. The identified text of the information sign received from the text recognition module 44a of the pattern recognition module 44 may be translated 55 by the language translation module 13 by retrieving, for example, the English translation of the Italian text of the image recorded by the driver. A word-per-word translation of the text "10 km back-up from the Carpi exit to the junction with the A1," may be provided 56 visually on the display 16 as well as acoustically via the loudspeakers 15, after text-to-speech conversion as described above. The output on the display may be performed by superimposing the translation result over the original Italian text within the image of the information sign or in a separate window opened automatically on the display 15.

Since the language translation module 13 may be connected to the vehicle position determination module 43, from the current position of the vehicle the input language may be derived automatically by the language translation module 13. Thus, it may not be necessary for the driver to specify the input language of the translation by a further input command. Further, since the relevant data of the data base 18b to be searched for translation may be narrowed down to one language to be searched, the data processing for translation may be substantially accelerated. In addition, the input language as well as the output language may be preset by the driver.

The system shown in FIGS. 3 and 4 may enable the driver to easily translate information signs installed in the area where she/he is currently travelling. The translation result may be stored in the storage device 46 of the translation system 30, so that the driver may obtain translations of the information given by the road or information signs at any time during the trip for information purposes, for example as a reminder. Thus, the information status of the driver travelling abroad may be significantly enhanced. Since there is no need for the driver to remember a text comprising several words of a foreign language he is not familiar with, he may concentrate on driving thereby increasing the safety of his travel. Moreover, because translation may be substantially contemporaneous, there may be no need for any time-consuming stops to search in a conventional language dictionary. The system may further permit the driver of the vehicle to pre-set the system to provide only certain information. For example, the driver may chose to preset the system to provide only translation information relating to official traffic signs. The system also may permit the setting of the input language based on the location of the vehicle as determined by a navigation device, such as GPS.

While the system shown in FIG. 3 includes a pair of video cameras 31a, 31b, a single camera also may be used, for example, if position data at the information sign is included by map data of the respective area. In addition, the position of the information sign also may be determined by use of a 3D laser sensor.

The translation system also may be used to provide translated information from an external source. For example, the translation function of the system may include translation of radio broadcasts of traffic and travel related conditions, for example weather conditions or road conditions or closures, and traffic signs that may be encountered on the route of travel. A contemporaneous translation of, for example, a traffic or travel related announcement may be made and provided to the driver upon receipt of the announcement, or it may be stored in the system by the driver and translated in response to a further command from the driver.

For information relating to signs, the system may comprise a digital photo and/or video camera for detecting signs in the vicinity of the vehicle. Pattern recognition analysis of the image may be provided based on the shape, dimensions, and/or colors of the sign to be translated. Pattern recognition also may include text recognition for the text of the sign.

Pattern recognition also may include identifying a traffic sign of a particular country from image elements of traffic signs of different countries stored in the system. The image stored image elements then may be compared to elements of the image detected by the video camera for identification. An image corresponding to a traffic sign of the driver's home country or text or audio information reflecting the meaning of the traffic sign may be provided to the driver. By identifying traffic signs of foreign countries and providing the information to the driver, the driver may obtain important traffic information which, otherwise, he would normally not be able to understand.

The position of a sign also may be determined. For example, a video cameral may be provided for measuring the distance and the angle of a traffic sign with respect to the vehicle. Since the position of the video camera at the vehicle is known, the position of the information sign relative to the vehicle may be easily calculated from these measurements. Since the position of the vehicle and, if necessary, its advancing direction may be detected by position determination devices and systems, such as a GPS unit and/or a gyrometer, the exact position of the detected information sign may be obtained according to the known principles of photogrammetry and stereo-image analysis. By comparing the determined position of the information sign and the location data of the driving route of the vehicle provided by the navigation system, whether the information sign is located on the current route of the vehicle also may be determined.

Figure 6:
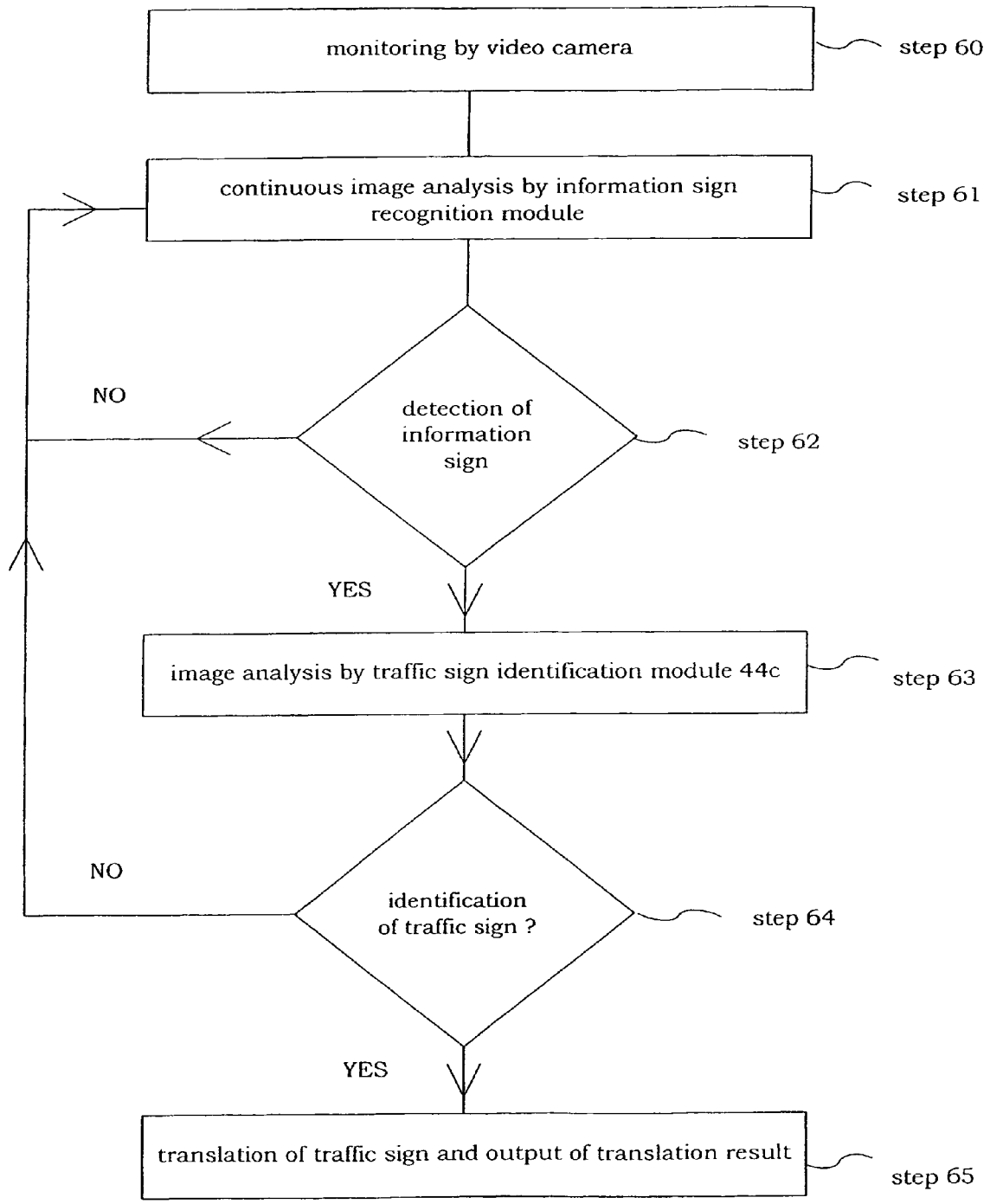
FIG. 6 is a flow chart illustrating the outputting of information to a driver of a vehicle, including the translation of a traffic sign

FIG. 6 shows an example of a procedure for identifying and translating a traffic sign in a foreign country using the system shown in FIGS. 3 and 4. In this example, the area surrounding a vehicle travelling abroad, for example, in Egypt, may be monitored 60 by any of the video cameras 31a, 31b. The image detected by the video camera may be continuously analyzed by the information sign recognition module 44a of the pattern recognition unit 44 for recognizing an information sign in step 61 on the basis of its dimensions and shape by comparison with data stored in the information and traffic sign storage device 44d. If no information sign is detected, the monitoring 60 continues. If an information sign is detected 62 by the information sign detection module 44a, the image data of the information sign may be transmitted to the traffic sign identification module 44c where a further image analysis is performed 63 by comparing the elements of the image with characteristic elements of official traffic signs of the respective country (i.e. Egypt in this example) that are stored in the information and traffic sign storage device 44d. While the traffic sign identification module 44c and the information sign recognition module 44b are shown in FIG. 6 as separate modules, a single software module for performing both functions may be provided.

Because data may be exchanged between the traffic sign identification module 44c and the vehicle position determination module 43 through the data processing unit 45, from the current position of the vehicle, i.e., from the determination of the country where the vehicle is currently travelling, the relevant group of traffic signs may be narrowed down automatically by reducing them to those of Egypt (in the present example) before performing the traffic sign identification procedure. Thereby, the speed of data processing may be significantly increased. In this example, if an Egyptian traffic sign has been identified 64, the meaning of that traffic sign, which may be stored in the information and traffic sign storage device 44d, is retrieved and output as a translation result 65 visually on the display 14 and/or acoustically via the loudspeakers 15. Alternatively or additionally to the text output, the corresponding traffic sign of the home country of the driver, for example, the corresponding United States traffic sign, may be displayed on the display 15. If the detected information sign cannot be identified as a traffic sign by the traffic sign identification module 44c, analysis by the information sign recognition module 61 resumes.

"Information sign," as used in this application is not limited to official road or highway information signs, but may include any kind of signage encountered by a driver, such as that relating to landmarks, advertisements, lodging, fuel, and the like. Thus, the term "information sign" may include official traffic signs according to the traffic regulations of the respective country, as well as any other information sign that may be useful to the driver.

Figure 7A:
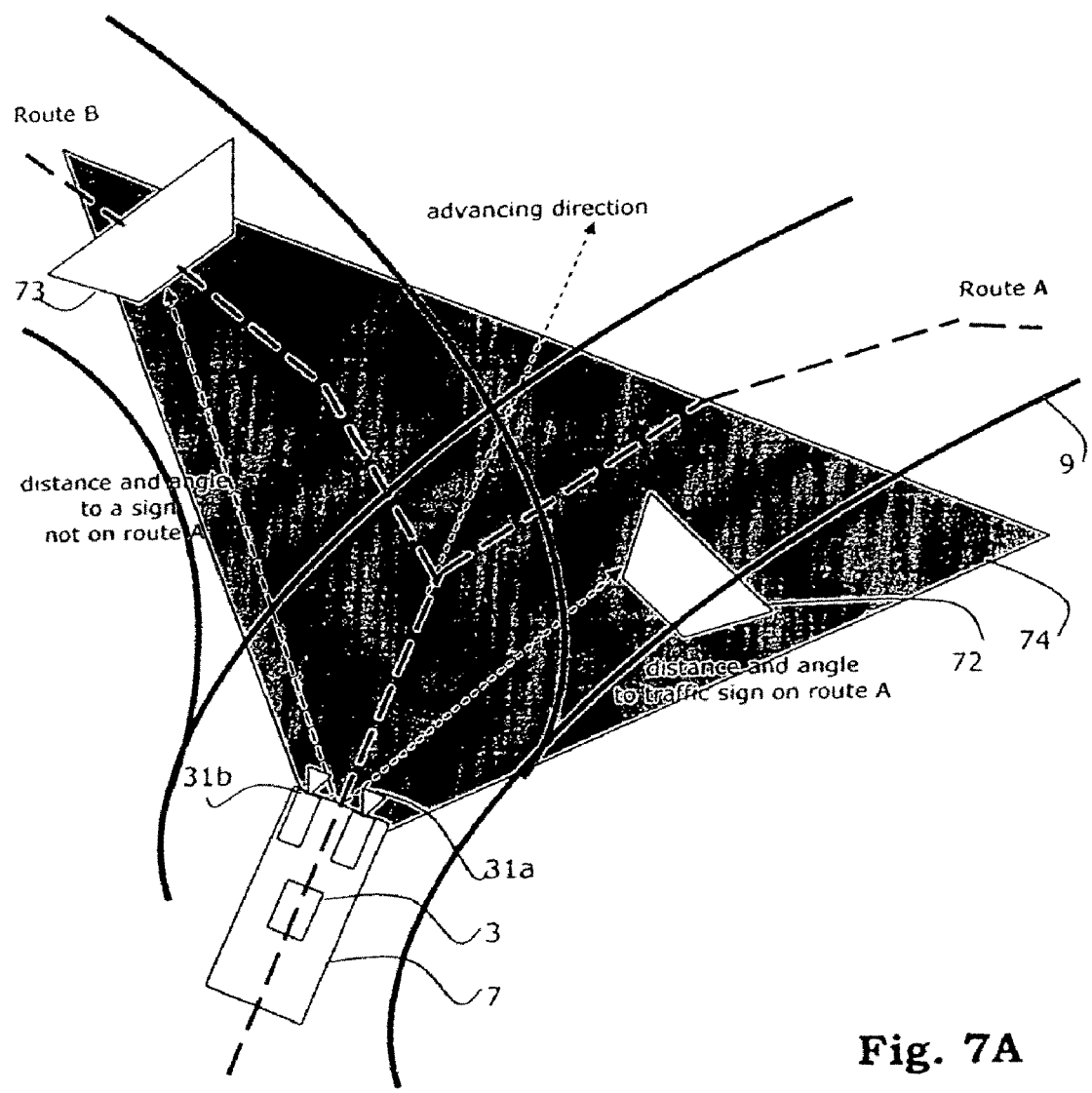
FIG. 7A shows determination of the position of a sign in relation to a route.
Figure 7B:
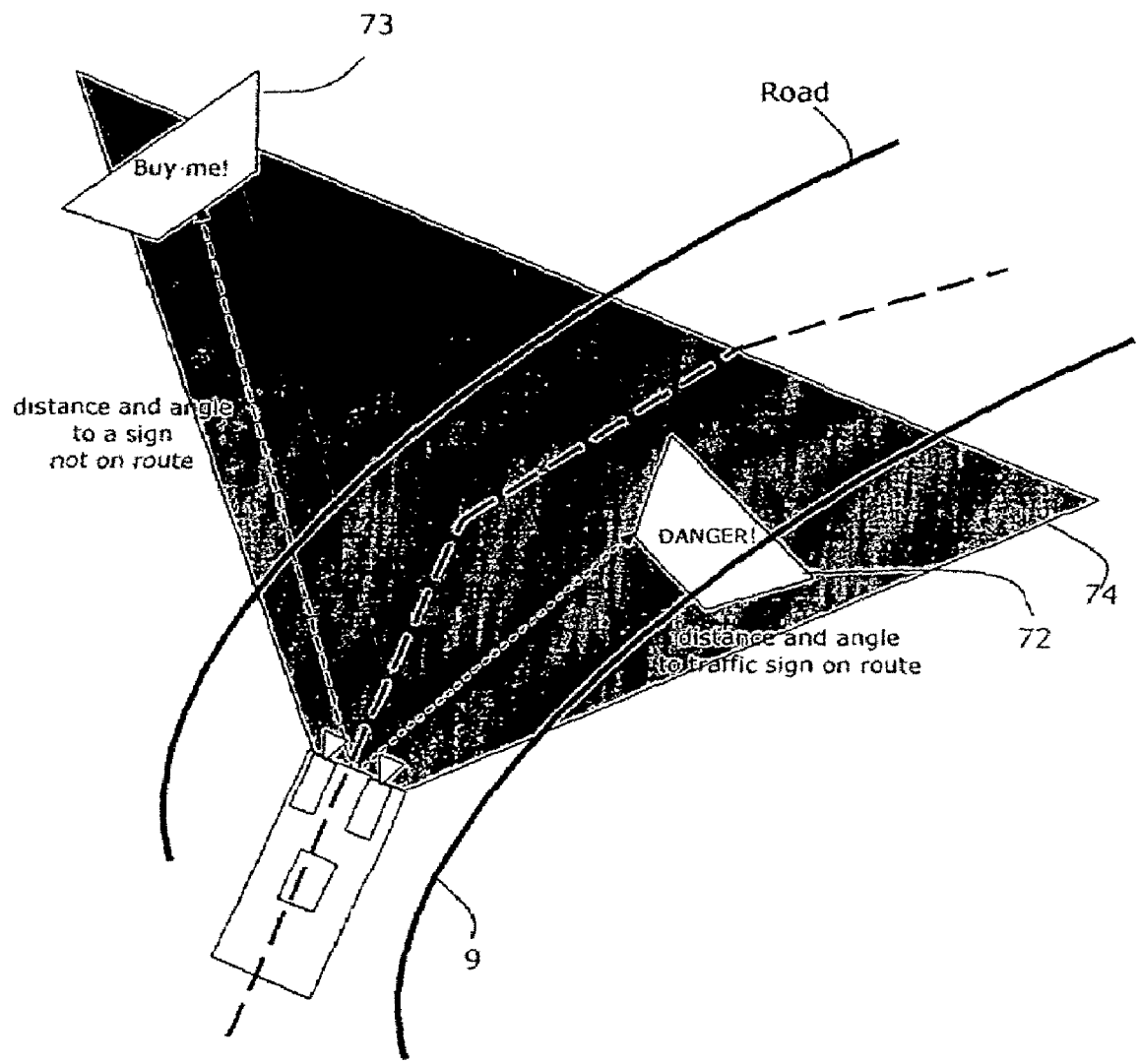
FIG. 7B shows determination of the position of a sign in relation to a road.
Figure 8:
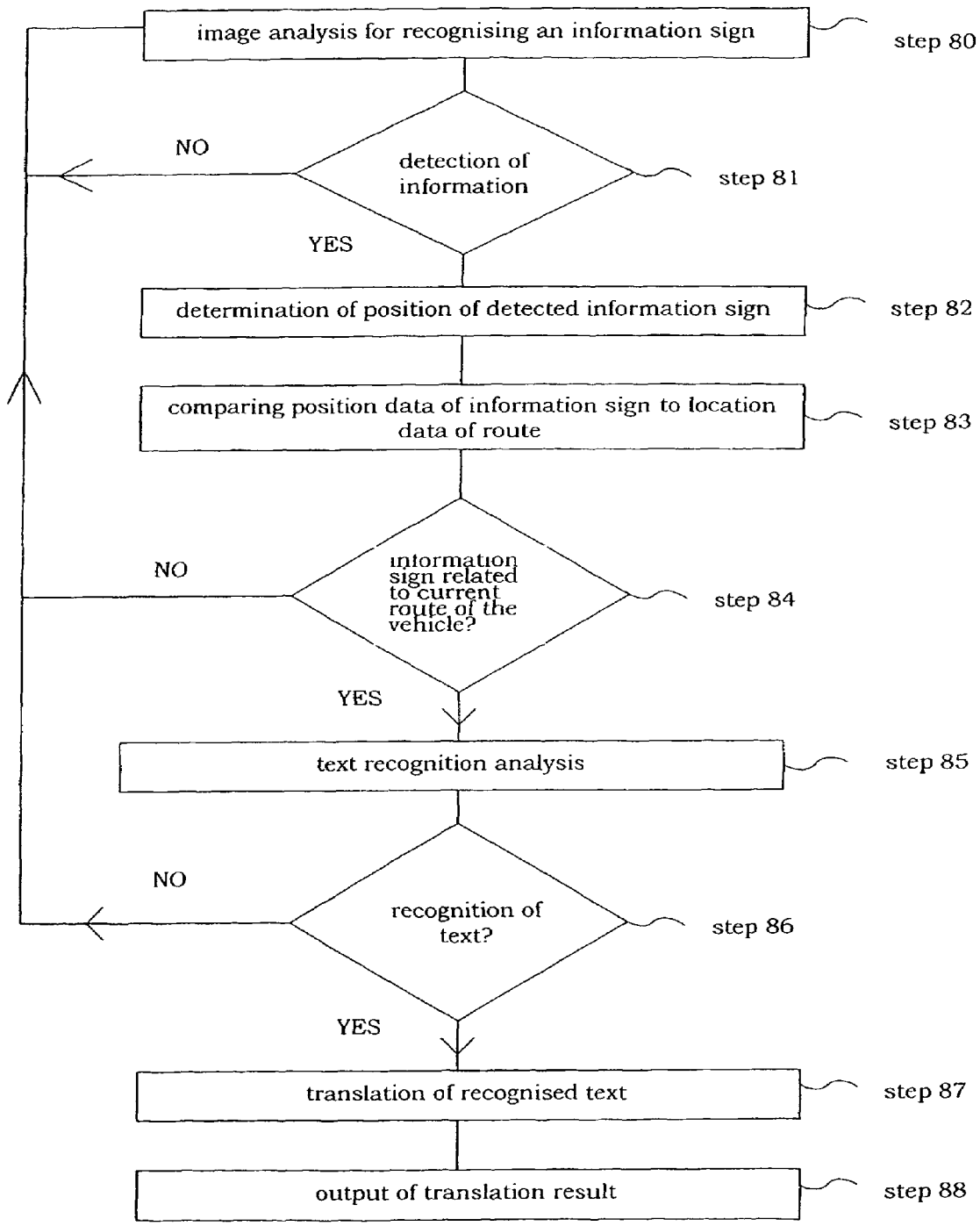
FIG. 8 is a flow chart illustrating the outputting of translated information to the driver of a vehicle including the determination of the position of an information sign according to FIG. 7.

In FIGS. 7A, 7B and 8, performance of the output translation of an information sign, as relative to the position of the information sign relative to the road and/or route of travel of the vehicle is shown. In FIGS. 7A and 7B, a vehicle 70 equipped with a system 3 is travelling on the road along a route A. At the current position of the vehicle 70 illustrated in FIG. 7, the video cameras 31a, 31b detect traffic signs 72 and 73, in the monitoring field 74, with sign 72 located on route A and sign 73 located on route B. In this example, the system may provide a translation of traffic signs 72, 73 based on whether the traffic sign is located on the current driving route of the vehicle.

Figure 9:
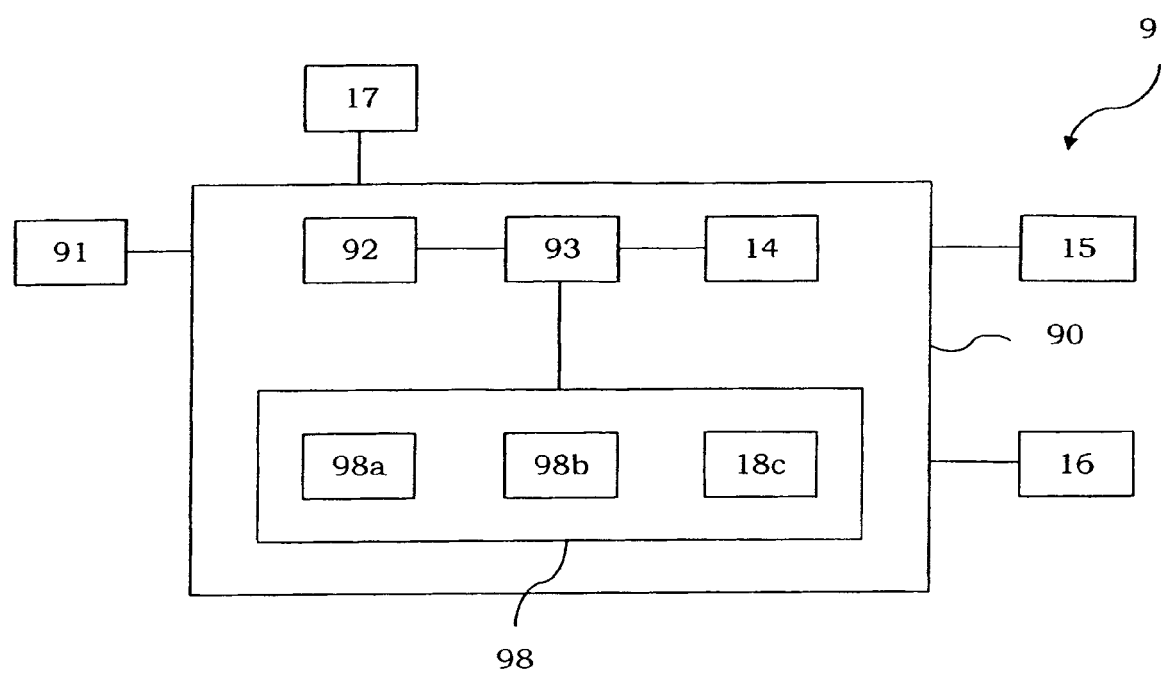
FIG. 9 is a block diagram of an example of a vehicle-mounted translation system having a function for translating a traffic announcement received from a broadcasting station.

In FIG. 9, the images obtained by the digital video cameras 31a and 31b may be analyzed continuously 80 by the information sign detection module 44b by comparing these images to the pattern data of the information and traffic sign storage device 44d. If one of the signs 72, 73 of FIGS. 7 or 8 is detected 81, the position of the signposts 72, 73 relative to the position of the vehicle 70 may be determined 82 by the information sign position determination module 42 on the basis of the distance of the signs 72, 73 to the vehicle and the angles of the camera positions relative to the signs 72, 73. Since the position of the vehicle 70 and its advancing direction, as well as the orientation of the video cameras 31a, 31b with reference to the vehicle 70, may be known, the absolute positions of the information sign signposts 72, 73 according to the known principles of photogrammetry may be calculated.

In particular, stereo analysis based on two images, as described, for example, in "Photogrammetrie" by Kraus, K., Dümmler Verlag, Bonn 1997, which is incorporated in its entirety herein by reference, may be used. Photogrammetry, generally, reverses the photographic process of transformation or mapping from three dimensions to two dimensions. Thus, photogrammetry converts or maps flat two dimensional images into the real three dimensional world. Because information is lost in the photographic process, the three dimensional world may not be completely reconstructed with just one photograph. Thus, the fundamental principle used by photogrammetry is triangulation. By taking photographs from at least two different locations, so-called "lines of sight" may be developed from each camera to points on the object. These lines of sight, sometimes referred to as rays due to their optical nature, are mathematically intersected to produce the three-dimensional coordinates of the points of interest.

The calculated position data of the information signs 72, 73 may be compared to location data of the driving routes A, B 83 of the vehicle 70 obtained from the navigation module 47 by the data processing unit 45, and the distance between the road according to route A and the information signs 72, 73 may be determined. It then may be determined whether the signs are located on or related to the current driving route 84. In the example shown in FIGS. 7A and 7B, sign 72 is related to the current driving route A of vehicle 70, whereas sign 73 is not.

If the signs 72, 73 are determined to be related to the current driving route, a text recognition analysis may be performed 85 by the text recognition module 44*a* of the pattern recognition unit 44. If any text is recognized 86 by the text recognition module 44*a*, the recognized text may be transmitted to the language translation module 13 for translation 87. The translation retrieved from the dictionary storage means 18*a* by the translation module 13 may be output to the driver 88 on the display 15 and/or via the loudspeaker 16, as described above with reference to FIG. 5.

While the method of FIG. 8 has been described translating text of an information sign, the application is not restricted in this sense. For example, instead of or in addition to the recognition and translation of text, an analysis for identifying a traffic sign may be performed, as described at 63 and 64 of FIG. 6.

Instead of determining whether the information relates to a driving route of the vehicle, the method may terminate after determining the distance between signs 72, 73 and road 9, as shown in FIG. 7B. In this example, whether a translation is made may depend on the result of determining the distance between the signs 72, 73 and the road on which the vehicle is travelling. This is based on the assumption that official traffic signs are located nearer to a roadway than information signs that are not official traffic signs.

In FIG. 7B, given the short distance between the road and information sign 72, it may be concluded that information sign 72 is a traffic sign and, accordingly, only sign 72 may submitted to an identification analysis for translation. In contrast, given the comparatively long distance between the road and traffic sign 73 it may be concluded that traffic sign 73 is not traffic sign, but another informational sign.

A system that enables translation of traffic announcements received by a radio receiver is illustrated in FIG. 9. The system 9 may include a radio receiver 91, a head unit 90, a display 16, loudspeakers 15, and a control panel 17 for controlling the head unit 90 and/or the radio receiver 91. The head unit 90 may include a storage device 98 for storing traffic announcements received by the radio receiver 91, a speech recognition module 92 for deciphering the traffic announcement received from a broadcasting station, an automatic language translation module 93 and a text-to-speech module 14, as well as related storage device 98*a* comprising data for a speech-to-text synthesis, a language data storage device 98 and a storage device 18*c* comprising data for a text-to-speech synthesis. The radio receiver 91 may be an analog or a digital device. The speech recognition module 92 may be adapted thereto and may comprise an A/D converter.

Figure 10:
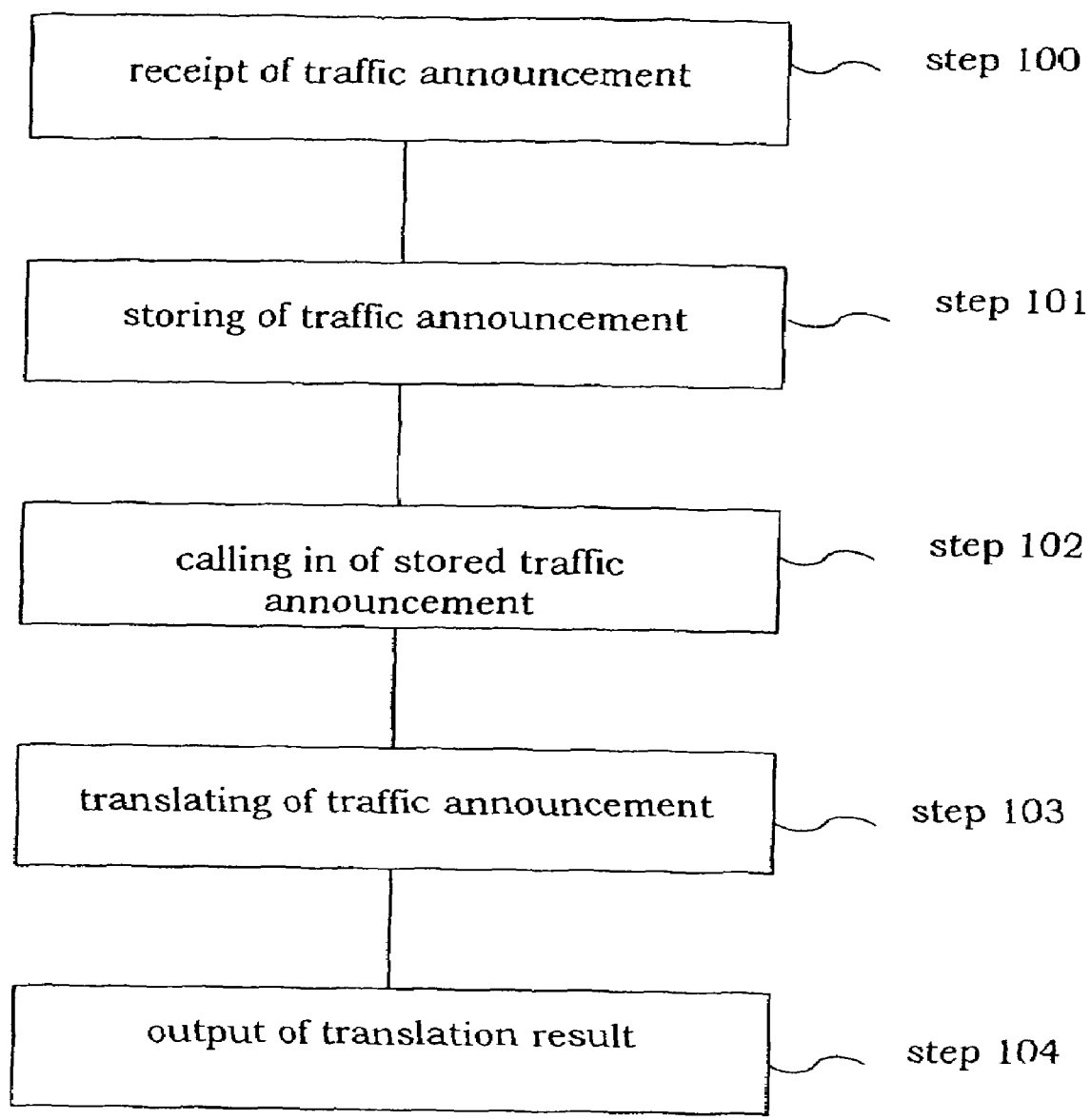
FIG. 10 is a flow chart illustrating the outputting of translated information to the driver of a vehicle, including the translation of a traffic announcement received from a broadcasting station.

FIG. 10 shows an example of a method for providing information to a driver of a vehicle using the system 9 of FIG. 10. Information may be received by the vehicle radio receiver, either automatically or by command of the driver, and speech recognition analysis may be performed. The information may be translated into the driver's desired language and provided to the driver in audio and/or visual form, as described previously.

As shown in FIG. 10, the radio receiver 91 receives a traffic announcement in a foreign language 100. If the radio receiver 91 is off during the drive, the traffic announcements may be stored 101 in the traffic. As shown in FIG. 10, the driver of a vehicle may call up the latest traffic announcements received by the radio receiver 102 from the traffic announcement storage device 98 by actuating a button of the control panel 17. In response thereto, the requested traffic announcement may be output to the driver via the loudspeaker 15. Thereafter, the driver may request a translation of the traffic announcement by selecting a corresponding item of the software menu shown on the display by means of the control panel. In response thereto, the traffic announcement data may be transmitted to the automatic language translation module 93. The received traffic announcement may be translated 103 by the language translation module 93 and the translation of the traffic announcement into the desired language is output to the driver 104 on the display 16 as a text and/or after a TTS conversion by the TTS module 14 via the loudspeakers 15 of the audio system. Thus, a driver of a vehicle travelling in a foreign country may receive translated traffic announcements enabling the driver to stay abreast of the latest traffic events and make route decisions based on that information.

This application is not limited to the particular examples described above. The individual components of described system may be combined in any suitable manner to practice the system according to the respective demands of the user. In addition, while various aspects of the invention have been described, it will be apparent to those of ordinary skill in the art that many more aspects and implementations are possible within the scope of the invention. Accordingly, the invention is not to be restricted except in light of the attached claims and their equivalents.

What is claimed is:

1. A system for providing translated information to a driver of a vehicle having a navigation system, comprising:
    an information input unit for entering first information comprising a first language comprising at least one camera and a pattern recognition unit;
    a translation unit for translating the first information into second information comprising a second language;
    a data storage unit for storing the first information and the second information;
    a data processing unit for retrieving the second information from the data storage unit, and
    an information output unit for transmitting the second information to the driver,
    at least one position determination unit for determining the current position of the vehicle and a current position of a sign;
    where the translation unit comprises an automatic setting of the input language based on the current position of the vehicle;
    where the at least one position determination unit detects whether the sign is located on the current route of the vehicle and translates the sign only if the sign is located on the current route of the vehicle; and
    where the system is mounted in the vehicle and associated with the navigation system of the vehicle.

2. The system of claim 1, where the first information comprises words of the first language and the second information comprises words of the second language.

3. The system of claim 2, where the translation unit provides a context related translation of a phrase or a sentence of the first language into a phrase or a sentence of the second language.

4. The system of claim 1, further comprising a sign recognition module.

5. The system of claim 4, comprising recognition and translation of an informational sign.

6. The system of claim 4, where the output unit provides an audio description of the meaning of the sign.

7. The system of claim 4, where the output unit provides a visual depiction of the meaning of the sign.

8. The system of claim 7, where the visual depiction comprises text.

9. The system of claim 7, where the visual depiction comprises symbols.

10. The system of claim 7, where the visual depiction comprises a comparable sign of the driver's home country.

11. The system of claim 1, where the output unit provides text-to-speech conversion.

12. The system of claim 1, where the input device comprises a microphone and a speech recognition unit associated with the microphone.

13. The system of claim 1, where the input device is selected from the group consisting of a joystick, keyboard, shaft encoder, touch pad, touch screen, and any combination thereof.

14. The system of claim 1, where the input unit receives information from a source external to the vehicle.

15. The system of claim 14, where the source external to the vehicle comprises a radio broadcast.

16. The system of claim 14, where the source external to the vehicle comprises the Internet.

17. The system of claim 1, where the camera is selected from the group consisting of digital photo cameras, video cameras, or a combination thereof.

18. The system of claim 1, where the pattern recognition unit provides recognition of an informational sign.

19. The system of claim 1, where the pattern recognition unit provides text recognition.

20. The system of claim 1, where the pattern recognition unit includes a storage unit for storing image elements of a plurality of signs.

21. The system of claim 1, where the position determination unit comprises GPS.

22. The system of claim 1, where the pattern recognition unit provides identification of the position of the sign with reference to the position of the vehicle.

23. The system of claim 1, further comprising a radio receiver for receiving traffic and/or travel announcements in the first language.

24. The system of claim 1, further comprising a telematic unit for receiving words of the first language.

25. The system of claim 1, where the system is integral to a navigation system of the vehicle.

26. A method for providing a language translation to a driver of a vehicle having an on-board computer system, comprising;
   providing a navigation system associated with the computer system;
   providing a translation system associated with the computer system;
   detecting the current position of the vehicle;
   automatically selecting the first language based on the currently position of the Vehicle;
   entering first information comprising a first language into the translation system;
   performing a speech recognition analysis of the first information;
   translating the first language into a second language; and
   providing the translated information to the driver of the vehicle.

27. A method for providing a language translation to a driver of a vehicle having an on-board computer system, comprising;
   providing a navigation system associated with the computer system;
   providing a translation system associated with the computer system of the vehicle;
   receiving information comprising a first language from a source external to the vehicle;
   entering information comprising the first language into the translation system;
   detecting the current position of the vehicle;
   automatically selecting the first language based on the currently position of the vehicle;
   performing a speech recognition analysis of the first information;
   translating the first language into a second language; and
   providing the translated information to the driver of the vehicle.

28. The method of claim 27, where the external source is a radio broadcast.

29. The method of claim 27, where the external source is the Internet.

30. A method of providing translated information relating to the meaning of informational travel or traffic signs to a driver of a vehicle having an on-board computer system, comprising:
   providing a navigation system associated with the computer system;
   providing a translation system associated with the computer system of the vehicle;
   monitoring the area in the vicinity of the vehicle with at least one video camera;
   continuously performing pattern recognition analysis of at least one image taken by the video camera;
   detecting the position of the vehicle;
   determining a driving route of the vehicle;
   automatically identifying an input language based on the position of the vehicle,
   associated with the position of the vehicle
   detecting at least one informational sign by pattern recognition analysis;
   detecting a position of an informational sign relative to the position of the vehicle;
   determining the absolute position of the sign from the position of the vehicle and the relative position of the sign;
   comparing the position of the sign and the position data of the location of the vehicle;
   determining that the sign is located on the route of the vehicle;
   performing a translation of the sign if the sign is located on the route of the vehicle when the sign is located within a predetermined distance from the location of the vehicle; and
   providing the translation to the driver.

31. The method of claim 30 where the output comprises an audio translation of the meaning of the detected sign.

32. The method of claim 30 where the output comprises a textual translation of the meaning of the detected sign.

33. The method of claim 30 where the output comprises an image of a symbol or sign from the driver's home country corresponding to the meaning of the detected sign.

34. The method of claim 30, further comprising performing text recognition analysis of the image of the sign.

* * * * *

UNITED STATES PATENT AND TRADEMARK OFFICE
CERTIFICATE OF CORRECTION

PATENT NO. : 7,386,437 B2  Page 1 of 1
APPLICATION NO. : 10/917944
DATED : June 10, 2008
INVENTOR(S) : Christian Brülle-Drews It is certified that error appears in the above-identified patent and that said Letters Patent is hereby corrected as shown below:

In column 11, claim 26, line 40, immediately after "comprising" delete ";" and substitute --:-- in its place.

In column 11, claim 26, line 47, delete "currently position of the Vehicle" and substitute --current position of the vehicle-- in its place.

In column 11, claim 27, line 57, immediately after "comprising" delete ";" and substitute --:-- in its place.

In column 12, claim 27, line 7, before "position of the" delete "currently" and substitute --current-- in its place.

In column 12, claim 30, line 33, immediately after "position of the vehicle" insert --;--.

In column 12, claim 31, line 50, immediately after "claim 30" insert --,--.

In column 12, claim 32, line 52, immediately after "claim 30" insert --,--.

In column 12, claim 33, line 54, immediately after "claim 30" insert --,--.

Signed and Sealed this

Twelfth Day of May, 2009

JOHN DOLL
*Acting Director of the United States Patent and Trademark Office*